Aug. 26, 1958 P. R. J. COURT 2,849,612

SYNCHRONIZATION SYSTEM

Filed Oct. 5, 1955

Inventor
PATRICK R. J. COURT
by
Mason, Kolehmainen, Rathburn and Wyss
Attorneys

United States Patent Office 2,849,612

Patented Aug. 26, 1958

2,849,612

SYNCHRONIZATION SYSTEM

Patrick R. J. Court, Buffalo, N. Y., assignor to Sylvania Electric Products, Inc., a corporation of Massachusetts Application October 5, 1955, Serial No. 538,636

3 Claims. (Cl. 250—36)

Figures 1, 2, 3:
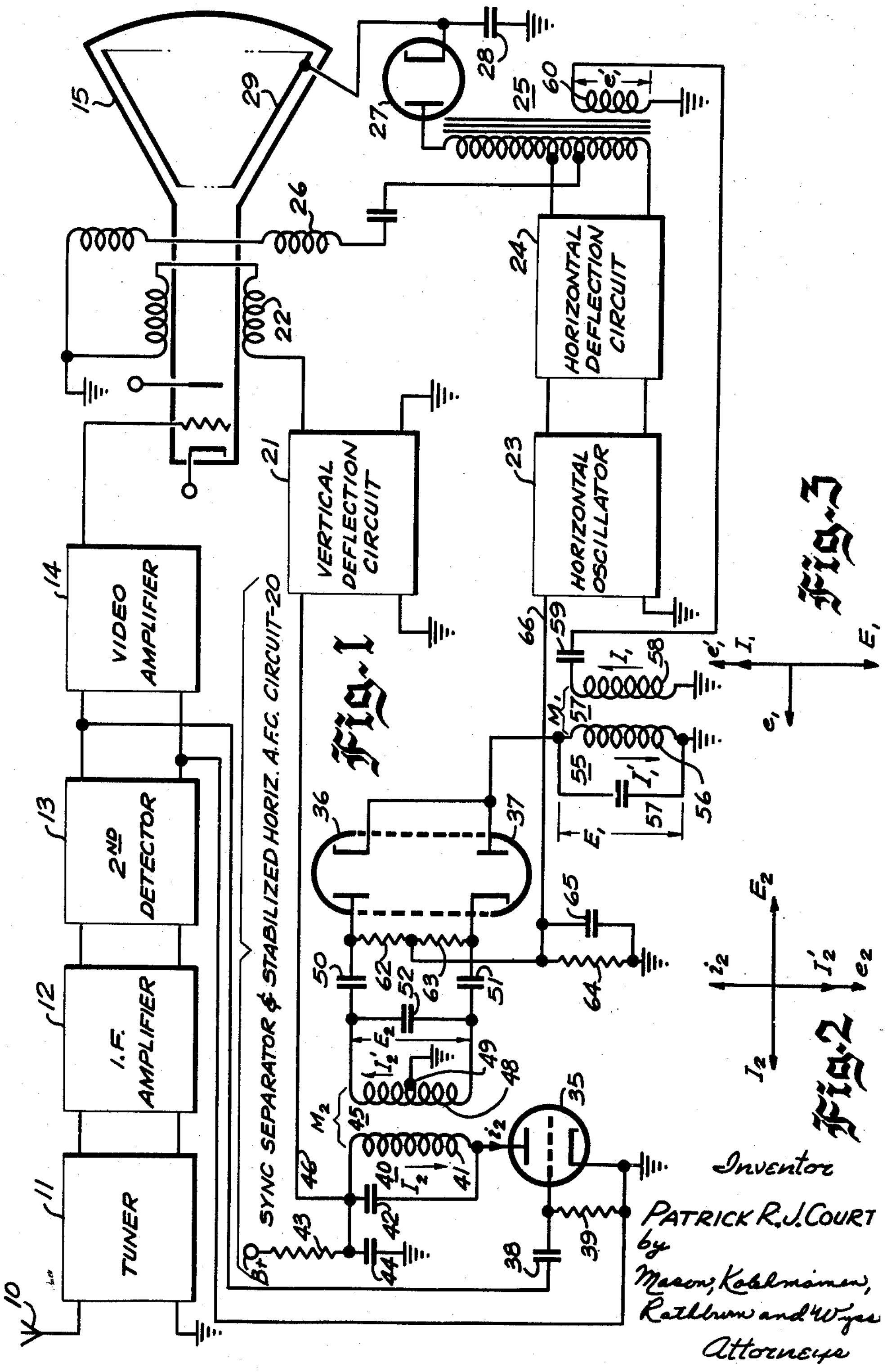

The present invention relates to a synchronization system, and more particularly to a synchronization system suitable for use in conjunction with the horizontal deflection system of a television receiver to maintain the horizontal deflection system in synchronism with the synchronizing pulse components of a received television signal.

In television synchronization systems certain arrangements have been heretofore proposed wherein a resonant circuit, which is tuned to the fundamental frequency of the horizontal synchronizing pulses, has been employed to synchronize the horizontal oscillator of the receiver while providing some immunity against noise impulses which are interspersed with the synchronizing pulses and tend to affect the horizontal deflection system. With such an arrangement, as the Q of the resonant circuit is increased, increasingly better noise immunity is achieved. However, when a high Q resonant circuit is used a phase shift is produced between the sinusoidal output signal which is derived from the resonant circuit and the incoming horizontal synchronizing pulses if the pulse repetition rate of the horizontal synchronizing pulses changes. While the frequency of the horizontal synchronizing pulses is held to extremely close tolerances under present day color television standards, in the field of black and white television the frequency of the horizontal synchronizing pulses may vary over relatively wide limits and in most instances the horizontal synchronizing pulse generator at the transmitter is tied in with the 60 cycle power line and hence experiences all of the frequency fluctuations of the normal power line supply. Since most of the existing transmitters are for black and white television wherein the horizontal synchronizing pulse frequency varies over relatively wide limits, most of the present day commercial television receivers have not been able to use a high Q resonant circuit arrangement even though this arrangement is extremely desirable from the standpoint of simplicity and cost.

It is, therefore, an object of the present invention to provide a new and improved synchronization system for television receivers wherein a resonant circuit may be employed to effect horizontal synchronization while providing adequate noise immunity and compensation for phase shift variations due to changes in the pulse repetition rate of the received horizontal synchronizing pulses.

It is another object of the present invention to provide a new and improved synchronization circuit for television receivers wherein a relatively high Q resonant circuit may be employed to effect synchronization while providing compensation for phase shift due to frequency variations of the received horizontal synchronizing pulses.

It is a further object of the present invention to provide a new and improved horizontal synchronization system for television receivers wherein a high Q resonant circuit is employed to derive a control signal from the fundamental frequency component of the received synchronizing pulses and wherein this control signal is substantially unaffected by variations in the pulse repetition rate of the received horizontal synchronizing pulses.

It is still another object of the present invention to provide a new and improved horizontal synchronizing system for television receivers wherein a first resonant circuit is employed to derive a control signal from the fundamental frequency component of the received horizontal synchronizing pulses and a second resonant circuit of substantially the same Q as the first resonant circuit is employed to compensate for variations in the pulse repetition rate of the received horizontal synchronizing pulses.

Briefly, in accordance with one phase of the invention, horizontal synchronizing pulses which have been separated from the video portion of the received television signal, are impressed upon a high Q resonant circuit which is tuned to the fundamental frequency of the horizontal synchronizing pulses so as to produce across this resonant circuit a sinusoidal synchronizing wave. A pulse signal is derived from the horizontal oscillator or deflection circuit of the television receiver and is impressed upon a second resonant circuit which is of substantially the same Q as the first resonant circuit and is also tuned to the same resonant frequency as the first resonant circuit. A sinusoidal feedback signal is derived from this second resonant circuit and both the sinusoidal synchronizing wave and the sinusoidal feedback signal are impressed upon a phase detector in the correct phase relationship to produce a substantially unidirectional control signal which is impressed upon the horizontal oscillator to control the frequency thereof. If the horizontal oscillator is not in synchronism with the incoming horizontal synchronizing pulses, a unidirectional control signal will be developed at the output of the phase detector which is of sufficient magnitude and of the correct polarity to adjust the frequency of the horizontal oscillator so that horizontal deflection is effected in synchronism with the received synchronizing pulses. If the pulse repetition rate of the incoming horizontal synchronizing pulses varies due to power line fluctuations at the transmitter, or for other reasons, a phase shift is produced in the first resonant circuit due to the fact that this resonant circuit has a relatively high Q. However, a corresponding phase shift is produced in the second resonant circuit since this resonant circuit is of substantially the same Q as the first resonant circuit with the result that the phase relationship of the sinusoidal synchronizing wave and the sinusoidal oscillator feedback signal which are impressed upon the phase detector does not change even though the pulse repetition rate of the horizontal synchronizing pulses varies over relatively wide limits. Accordingly, a high degree of noise immunity is afforded by the high Q resonant circuit while providing a synchronizing system which is relatively insensitive to frequency variations of the received synchronizing pulses so that present day black and white television signals may be received and the horizontal deflection system synchronized therewith in a relatively inexpensive and simple manner.

The invention, both as to its organization and method of operation, together with further objects and advantages thereof, will best be understood by reference to the following specification taken in connection with the accompanying drawings, in which:

Fig. 1 is a schematic diagram, partly in block diagram form, showing a television receiver which embodies the principles of the present invention; and Figs. 2 and 3 are vector diagrams illustrating the operation of the synchronizing system of the receiver of Fig. 1.

Referring now to the drawings, the present invention is therein illustrated in conjunction with a television receiver which includes an antenna system 10 connected to a tuner 11 to which are connected in cascade relation in the order named an intermediate frequency amplifier 12, a second detector 13, a video amplifier 14 and a cathode ray tube viewing device 15. A sync separator and stabilized horizontal AFC circuit 20, is connected to the output of the second detector 13 and supplies a vertical synchronizing pulse signal to the vertical deflection circuit 21, the output of the vertical deflection circuit 21 being employed to energize the vertical scanning coils 22 which surround the neck of the cathode ray tube 15. The circuit 20 also provides a control signal for the horizontal oscillator 23 of the receiver, the oscillator 23 developing a suitable horizontal drive signal which is impressed upon the horizontal deflection circuit 24 which includes the horizontal output transformer 25 which is arranged to drive the horizontal scanning coils 26 which surround the neck of the cathode ray tube 15, the transformer 25 also being employed in conjunction with the high voltage rectifier 27 and the filter condenser 28 to develop a suitable accelerating anode voltage for the second anode 29 of the cathode ray tube 15.

The units 10 to 15, inclusive, and 21 to 29, inclusive, may all be of conventional well-known construction so that a detailed description thereof is considered unnecessary herein. Referring briefly, however, to the operation of the above described receiver as a whole, television signals intercepted by the antenna system 1 are supplied to the tuner 11 wherein they are converted into corresponding intermediate frequency signals which are in turn selectively amplified in the amplifier 12 and are delivered to the second detector 13. The video modulation components of the received signal are supplied to the video amplifier 14 wherein they are amplified and impressed upon the control grid of the cathode ray tube 15. The detected modulation components of the received television signal are also supplied to the sync separator and stabilized AFC circuit 20 wherein the vertical synchronizing pulses are separated from the video components and are supplied to the vertical deflection circuit which functions to develop a vertical scanning wave in the coils 22. The sync separator and stabilized AFC circuit 20 also functions in the manner to be described in more detail hereinafter, to develop a control signal which is impressed upon the horizontal oscillator 23, this oscillator developing a suitable sawtooth scanning wave which is amplified in the deflection circuit 24 and is impressed upon the transformer 25 so as to develop a horizontal scanning wave in the coils 26. During the horizontal retrace intervals a relatively high amplitude pulse is developed across the transformer 25, this pulse being rectified in the rectifier 27 to provide a high unidirectional voltage for the accelerating anode 29. In this connection it will be understood that any suitable sound channel (not shown) may be employed to derive the sound signal which accompanies the television picture signal, as will be readily understood by those skilled in the art.

Referring now more particularly to the portions of the receiver of Fig. 1 which relate to the present invention, the circuit 20 includes a sync separator tube 35 and a pair of diode phase detector tubes 36 and 37. The detected modulation components from the detector 13 are coupled through the condenser 38 to the control grid of the separator tube 35, this control grid being connected to the cathode through the grid leak resistor 39 so that the tube 35 is operated at zero bias. The modulation components are impressed upon the tube 35 in the correct polarity so that this tube conducts only during the horizontal and vertical synchronizing pulse intervals and a first resonant circuit 40 is connected to the anode of the tube 35 and through the resistor 43 to the B+ supply, a filter condenser 44 being connected between the junction point of the resistor 43 and the resonant circuit 40 to ground. The resonant circuit 40 includes a coil 41 which forms a primary of a coupling transformer 45, and a condenser 42 connected across the coil 41, and the parallel coil and condenser combination 41, 42 is tuned to the fundamental frequency of the horizontal synchronizing pulses, and has a relatively high Q or ratio of stored energy to dissipated energy. The time constant of the resistor 43 and the condenser 44 is so chosen that the vertical synchronizing pulses are developed across the condenser 44, these vertical synchronizing pulses being supplied over the conductor 46 to the vertical deflection circuit to control synchronism thereof in the manner described above.

During the horizontal synchronizing pulse intervals current flows through the tube 35 and a sinusoidal synchronizing wave is developed across the resonant circuit 40, this sinusoidal synchronizing wave being relatively insensitive to noise impulses and other deleterious signals which may be present in the demodulated signal impressed upon the control grid of the tube 35 due to the flywheel effect of the relatively high Q circuit 40. This sinusoidal synchronizing wave is coupled to the secondary winding 48 of the transformer 45, the center tap 49 of the winding 48 being connected to ground and the winding 48 being tuned to the fundamental frequency of the horizontal synchronizing pulses by the condenser 52. One end of the winding 48 is coupled through the condenser 50 to the anode of the diode 36 and the other end of the winding 48 is coupled through the condenser 51 to the cathode of the diode 37, the cathode of the diode 36 and the anode of the diode 37 being connected together and through a second resonant circuit 55 to ground.

The resonant circuit 55 includes the coil 56 and the condenser 57, the coil and condenser combination 56, 57 being tuned to the same frequency as the circuit 40, i. e., the fundamental frequency of the horizontal synchronizing pulses. The coil 56 forms the secondary of a transformer 57 having a primary winding 58. One end of the primary winding 58 is connected to ground and the other end of the winding 58 is connected through the condenser 59 to the ungrounded end of an auxiliary winding 60 on the horizontal output transformer 25. The junction point of the diode load resistors 62 and 63 is connected to ground through the resistor 64 and parallel connected condenser 65 and a substantially unidirectional voltage is developed across the condenser 65 which is connected over the conductor 66 to the horizontal oscillator 23 to control the frequency and phase thereof, as will be readily understood by those skilled in the art.

Considering now the operation of the circuit 20, the demodulated wave supplied to the control grid of the sync separator tube 35 is of sufficient amplitude to drive this tube beyond cutoff during the picture or video portion of the demodulated signal so that the tube 35 conducts only during the horizontal and vertical synchronizing pulse intervals. During the vertical pulse intervals the resistor 43 and condenser 44 have the correct time constant to reproduce the vertical synchronizing pulses on the conductor 46 although the condenser 44 is of sufficiently large value to prevent the higher frequency horizontal synchronizing pulse components from appearing across this condenser. On the other hand, during the horizontal pulse intervals the plate current $i_2$ of the tube 35 flows through the resonant circuit 40 and shock excites this resonant circuit so as to produce a sinusoidal synchronizing current $I_2$ through the coil 41. This synchronizing current is coupled through the mutual inductance $M_2$ of the transformer 45 to the secondary winding 48 thereof, the winding 48 being tuned to the same resonant frequency as the circuit 40 by means of the condenser 52. The induced voltage may be considered as an equivalent generator $e_2$ (not shown) in series with the winding 48 which produces a current flow $I'_2$ through the winding 48. As a result the voltage $E_2$ is developed across the resonant circuit comprising the coil 48 and the condenser 52.

In order to develop a feedback reference signal which may be compared with the voltage $E_2$ to determine the necessary phase correction required to hold the horizontal oscillator 23 in synchronism with the received horizontal synchronizing pulses, the auxiliary winding 60 is provided on the horizontal output transformer 25 and feedback pulses $e'_1$ of positive polarity are developed across the winding 60 and are coupled through the condenser 59 to the primary winding 58 of the transformer 57. The winding 58 and the condenser 59 constitute a resonant circuit which is also tuned to the fundamental frequency of the horizontal synchronizing pulses, the winding 60 having a relatively small number of turns so that the current $I_1$ flowing through the winding 58 is substantially in phase with the pulse voltage $e'_1$ developed across the winding 60. The current $I_1$ flowing through the winding 58 induces a voltage in the secondary winding 56 due to the mutual coupling $M_1$ of the transformer 57, this induced voltage being considered as an equivalent generator $e_1$ (not shown) in series with the winding 56. Accordingly, a current $I'_1$ flows through the winding 56 so that a voltage $E_1$ is developed across the resonant circuit 55 and is coupled to the commonly connected cathode of the tube 36 and the anode of the tube 37.

In order to facilitate an understanding of the various voltages developed in the circuit 20 there is shown in Fig. 2 a vector diagram of the phase relationship of the voltages developed in the anode circuit of the sync separator tube 35 and the transformer 45 and in Fig. 3 there is shown a vector diagram of the voltages developed in the primary and secondary portions of the transformer 57. Thus, referring to Fig. 2, it is assumed that the sync separator tube current $i_2$ has the phase position shown in Fig. 2 and the current $I_2$ through the primary winding 41 has the following relationship thereto:

$$I_2=ji_2Q \qquad (1)$$

where Q is the energy factor of the coil 41.

From the above Equation 1 it will be evident that the current $i_2$ lags the current $I_2$ by ninety degrees as shown in Fig. 2. The equivalent generator voltage $e_2$ induced in series with the secondary winding 48 is given by the relationship:

$$e_2=j\omega M_2I_2 \qquad (2)$$

where $M_2$ is the mutual inductance between the windings 41 and 48.

From Equation 2 it will be seen that the equivalent generator voltage $e_2$ lags the current $I_2$ by ninety degrees and the separator tube current $i_2$ by one hundred and eighty degrees. The voltage developed across the resonant circuit 48, 52 is given by the relationship:

$$E_2=je_2Q \qquad (3)$$

where Q is the energy factor of the coil 48.

From Equation 3 it will be seen that the voltage $E_2$ which is impressed upon the phase detector lags the separator tube current $i_2$ by two hundred and seventy degrees.

Referring now to Fig. 3, it will be understood that the feedback pulse voltage $e'_1$ will be in phase with the separator tube current $i_2$ if the synchronization system is functioning properly to hold the horizontal oscillator 23 in synchronism with the received horizontal synchronizing pulses. The winding 60 has substantially no inductance so that the current $I_1$ through the primary 58 is in phase with the feedback voltage $e'_1$ as shown in Fig. 3. The equivalent generator voltage $e_1$ induced in the resonant circuit 55 is given by the relationship:

$$e_1=j\omega M_1I_1 \qquad (4)$$

where $M_1$ is the mutual inductance between the windings 56 and 58.

From Equation 4 it will be evident that the equivalent generator voltage $e_1$ lags the feedback voltage $e'_1$ by ninety degrees as shown in Fig. 3. The voltage $E_1$ developed across the resonant circuit 55 is given by the relationship:

$$E_1=je_1Q \qquad (5)$$

where Q is the energy factor of the coil 56.

From Equation 5 it will be evident that the voltage $E_1$ which is impressed upon the phase detector lags the equivalent generator voltage $e_1$ by ninety degrees and the feedback voltage $e_1$ by one hundred and eighty degrees.

From a comparison of Figs. 2 and 3 it will be evident that the sinusoidal synchronizing voltage $E_2$, which is derived from the incoming horizontal synchronizing pulses, has a ninety degree phase relationship with respect to the sinusoidal reference voltage $E_1$ which is derived from the horizontal oscillator 23. Furthermore, the voltage $E_2$ is split into two oppositely phased voltages by means of the center tapped secondary winding 48 so that the diode 36 has impressed thereon a sinusoidal synchronizing wave of one polarity and the diode 37 has a sinusoidal synchronizing wave impressed thereon of the opposite polarity. The sinusoidal reference wave is impressed upon both diodes in the same polarity and these diodes function in a conventional manner to provide a control voltage across the condenser 65 which is responsive to changes in the phase relationship of the voltages $E_2$ and $E_1$. Accordingly, if the oscillator 23 is not in phase with the received synchronizing pulse a control voltage is developed on the conductor 66 which is of the correct polarity to change the frequency of the oscillator 23 in the correct direction to bring the oscillator 23 into synchronism with the incoming synchronizing pulse.

By comparing two sinusoidal waves in the phase detector, as distinguished from either a comparison of one pulse wave and one sinusoidal wave or a comparison of two pulse waves, there are no side lock effects and the pull-in range of the synchronization system is substantially increased. This is because there are no stable lock-in points at harmonics of the horizontal synchronizing frequency, as in the case of pulse synchronization, since the two sine waves which are compared are substantially pure and are relatively free from harmonics. Also, the tuned circuits 40 and 48, 52 remove virtually all of the 60 cycle vertical synchronizing pulse components so that these components do not affect the horizontal deflection circuit or cause bending of the picture as with conventional synchronization systems. Furthermore, by employing the resonant circuit 58, 59 to derive a sinusoidal reference wave from the output transformer 25 additional noise immunity is provided with respect to noise originating in the horizontal output circuit of the receiver. Such noise may arise from corona developed in the horizontal sweep transformer or from other points in the horizontal deflection circuit 24 as will be readily understood by those skilled in the art. With the resonant circuit 40 in the sync separator tube and the resonant circuit 58, 59 in the feedback circuit a relatively narrow noise band is provided for both the input and the output of the synchronization system.

As stated above the Q of the resonant circuit 40 is preferably quite high so that good noise immunity is achieved. However, if the frequency of the incoming synchronizing pulses changes by one or two percent, which it may readily do with conventional black and white transmitter systems, the sinusoidal synchronizing wave $E_2$ is shifted in phase with respect to the incoming synchronizing pulses. This will be readily apparent when it is realized that the tuned circuit 40 remains fixedly tuned to some arbitrary horizontal synchronizing frequency and if the pulse repetition rate of the incoming synchronizing pulses changes, the energy which is injected into the resonant circuit occurs at a somewhat different point on the sinusoidal wave since the frequency of the sinusoidal synchronizing wave must follow the frequency of the incoming synchronizing pulses. In the absence of the phase shift compensating circuit of the present invention, the shift in phase between the sinusoidal synchronizing wave and the incoming synchronizing pulses would cause a shift of the picture on the face of the cathode ray tube since the horizontal scanning wave is derived from the sinusoidal synchronizing wave whereas the video picture components have the same phase as the synchronizing pulses themselves. This sidewise shift of the picture is sufficiently severe to render the single high Q resonant circuit arrangement impractical for commercial television receivers. However, in accordance with the present invention a complementary phase shift is produced in the feedback circuit of the synchronization system so that insofar as the phase detector is concerned no phase shift occurs and hence the horizontal scanning wave developed from the horizontal oscillator 23 remains in phase with the video components of the received television signal even though the frequency of the incoming synchronizing pulses varies considerably. Thus, if the frequency of the incoming synchronizing pulses increases so as to produce a phase shift between the voltage $E_2$ and the incoming synchronizing pulses, a corresponding phase shift is produced between the feedback pulses developed across the auxiliary winding 60 and the sinusoidal reference voltage $E_1$. Accordingly, the phase detector compensates only for the actual change in frequency of the incoming synchronizing pulses and is not affected by a variation in the phase relationship between the sinusoidal reference wave $E_2$ and the incoming synchronizing pulses due to the above described action in the resonant circuit 40.

Since the phase shift produced in the resonant circuit 40 by changes in the incoming pulse frequency are related to the Q of the resonant circuit 40 it is evident that the Q of the resonant circuit 58, 59 should be substantially the same as the Q of the resonant circuit 40 so that complementary phase shifts will be produced in both circuits upon a change in synchronizing pulse frequency. Also the Q of the secondary resonant circuit 48, 52 should be substantially the same as the Q of the secondary resonant circuit 55 in the feedback loop so that these circuits respond equally to a change in the frequency of the horizontal frequency pulses.

While the sinusoidal reference wave has been illustrated as being derived from the auxiliary winding 60 on the horizontal output transformer 25 it will be evident that this reference wave may be derived from any other suitable point in the horizontal oscillator and deflection circuit. For example, if the horizontal oscillator 23 is of the multivibrator type wherein a stabilizing resonant circuit is employed in either the cathode or plate circuit of the multivibrator, the coil of this stabilizing circuit may serve as a source of sinusoidal reference voltage directly, it being understood that the proper Q and circuit conditions are established so that the voltages impressed upon the phase detector have the required ninety degree relationship. In the alternative, the horizontal oscillator may comprise a reactance controlled sinusoidal wave oscillator but the reactance controlled tank circuit of this oscillator cannot be used to develop the sinusoidal synchronizing wave directly since the reactance tube functions to change the frequency of the tank circuit continuously. However, if a reactance controlled sine wave oscillator is used a fixed tuned resonant circuit of relatively high Q may be employed to derive a sinusoidal synchronizing wave which may in turn be impressed upon the tank circuit of the reactance controlled oscillator to control the frequency thereof. In such case the requisite phase shift will be developed in the fixed tuned resonant circuit even though the reactance tube functions to correct the resonant frequency of the oscillator tank circuit as the synchronizing pulse frequency changes.

While there have been described what are at present considered to be the preferred embodiments of the invention, it will be understood that various modifications may be made therein which are within the true spirit and scope of the invention as defined in the appended claims.

What is claimed as new and is desired to be secured by Letters Patent of the United States is:

1. A synchronization system, comprising a source of synchronizing pulses, first and second resonant circuits, means for impressing pulses derived from said source on said first resonant circuit, means for deriving a first sinusoidal synchronizing wave from said first resonant circuit, an oscillator, means for impressing a signal derived from said oscillator on said second resonant circuit, means for deriving a second sinusoidal synchronizing wave from said second resonant circuit, phase detector means controlled by said first and second sinusoidal synchronizing waves for developing a control signal, and means for impressing said control signal on said oscillator, said first and second resonant circuits having substantially the same Q so that variations in the phase relationship of said synchronizing pulses and said first sinusoidal synchronizing wave are compensated by corresponding variations in the phase relationship of said oscillator signal and said second sinusoidal synchronizing wave.

2. In a television receiver, means to derive horiontal synchronization pulses from received television signals; a tuned high Q circuit, tuned to the fundamental frequency of the horizontal synchronization pulses; means to shock excite said tuned circuit with the derived horizontal synchronizing pulses so as to produce in said tuned circuit, a sinusoidal current of fundamental frequency; a phase detector; a parallel tuned high Q circuit tuned to said frequency, coupling said excited circuit to said phase detector; a local horizontal pulse generating circuit; a high Q circuit, resonant to the fundamental frequency of the locally generated pulses; means to shock excite said resonant high Q circuit with the locally generated pulses; a resonant, tuned circuit coupling said shock excited resonant circuit to said phase detector; and; a control connection connecting said phase detector to said local pulse generating circuit, the Q of said tuned and resonant circuits being the same.

3. In a television receiver, means to derive horizontal synchronizing pulses from received television signals; a high Q, tuned circuit, tuned to the fundamental frequency of said synchronizing pulses; means to shock excite the tuned circuit with the derived synchronizing pulses so as to produce a sinusoidal current of fundamental frequency in said tuned circuit; a pair of diode detectors each having an anode and a cathode; a parallel tuned, high Q circuit tuned to said fundamental frequency inductively coupled to said shock excited circuit, one end of said parallel tuned circuit being connected to the anode of one of said detectors and the other end of said circuit being connected to the cathode of the other of said detectors, the remaining cathode and anode of said detectors being directly connected together, an intermediate point on said parallel tuned circuit being connected to a ground terminal; a resistor connected between and to that anode and cathode which is connected to the ends of said parallel tuned circuit, a pair of parallel tuned resonant coupled circuits, each being of high Q and tuned to the fundamental frequency of the horizontal synchronizing pulses; a local generating circuit for locally generating pulses of horizontal synchronizing frequency; means to shock excite the first of said pair of coupled, resonant, parallel tuned circuits with locally generated, synchronizing pulses thereby causing sinusoidal waves of current of fundamental frequency to flow in the second of said pair of high Q resonant circuits; means connecting one end of said last mentioned resonant circuit to a ground terminal and the other end thereof to the anode and cathode of said detectors which are directly connected together; and, a control connection connected between an intermediate point on said resistor and said local generating circuit; the Q of all of said tuned and resonant circuits being substantially the same.

References Cited in the file of this patent

UNITED STATES PATENTS

| | | |
|---|---|---|
| 2,494,795 | Bradley | Jan. 17, 1950 |
| 2,510,095 | Frankel | June 6, 1950 |
| 2,724,776 | Sherwin | Nov. 22, 1955 |
| 2,743,369 | Sands | Apr. 24, 1956 |
| 2,751,430 | Kelly | June 19, 1956 |